United States Patent
Lindow et al.

(10) Patent No.: US 10,215,000 B2
(45) Date of Patent: Feb. 26, 2019

(54) SERIAL PARALLEL POWER CONTROLLER

(71) Applicant: SCHLUMBERGER TECHNOLOGY CORPORATION, Sugar Land, TX (US)

(72) Inventors: Benjamin P. Lindow, Provo, UT (US); David R. Hall, Provo, UT (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 311 days.

(21) Appl. No.: 15/122,264

(22) PCT Filed: Mar. 3, 2015

(86) PCT No.: PCT/US2015/018471
§ 371 (c)(1),
(2) Date: Aug. 29, 2016

(87) PCT Pub. No.: WO2015/134486
PCT Pub. Date: Sep. 11, 2015

(65) Prior Publication Data
US 2016/0369599 A1    Dec. 22, 2016

Related U.S. Application Data

(60) Provisional application No. 61/946,975, filed on Mar. 3, 2014.

(51) Int. Cl.
*H02J 1/10* (2006.01)
*E21B 41/00* (2006.01)
*E21B 4/04* (2006.01)
*H02J 4/00* (2006.01)

(52) U.S. Cl.
CPC ............ *E21B 41/0085* (2013.01); *E21B 4/04* (2013.01); *H02J 1/10* (2013.01); *H02J 4/00* (2013.01)

(58) Field of Classification Search
CPC ............................ Y10T 307/653; H02J 7/024
See application file for complete search history.

(56) References Cited

U.S. PATENT DOCUMENTS

| | | | | |
|---|---|---|---|---|
| 3,459,957 | A * | 8/1969 | Kelley | G05F 1/62 307/71 |
| 8,436,580 | B2 * | 5/2013 | Tai | H02J 7/0024 320/116 |
| 2002/0051368 | A1 | 5/2002 | Ulinski et al. | |

(Continued)

*Primary Examiner* — Fritz M Fleming

(57) ABSTRACT

A power controller includes at least a first and a second power supply each having a positive and a negative output terminal. A voltage measuring circuit is coupled to the positive and negative output terminals of at least one of the power supplies. A main switching element is coupled between the negative output terminal of the first power supply and the positive output terminal of the second power supply. The positive output terminal of the first power supply and the negative output terminal of the second power supply are connected to an electrical load. A pair of diodes is serially connected across the electrical load. The voltage measuring circuit is configured to close the main switching element when a measured voltage exceeds a selected threshold such that the first power supply and the second power supply are connected to the electrical load in parallel when the main switching element is closed.

26 Claims, 5 Drawing Sheets

(56) References Cited

U.S. PATENT DOCUMENTS

| | | |
|---|---|---|
| 2003/0173922 A1 | 9/2003 | Pelonis |
| 2006/0191687 A1 | 8/2006 | Storm et al. |
| 2010/0183430 A1 | 7/2010 | Winnacker |
| 2012/0217811 A1 | 8/2012 | Marien |

* cited by examiner

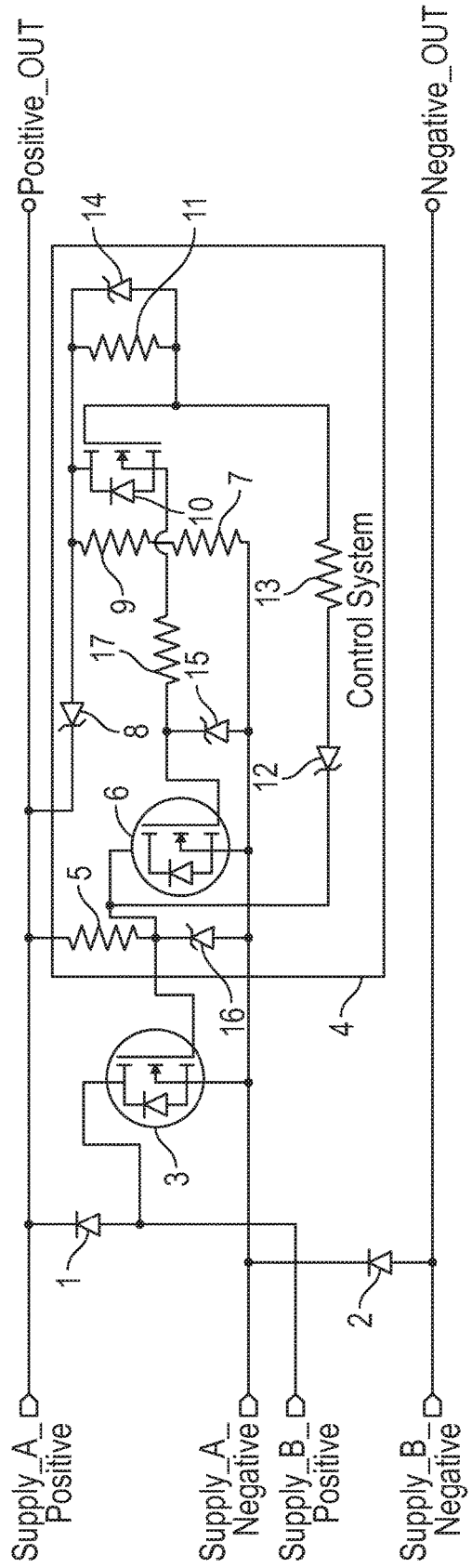
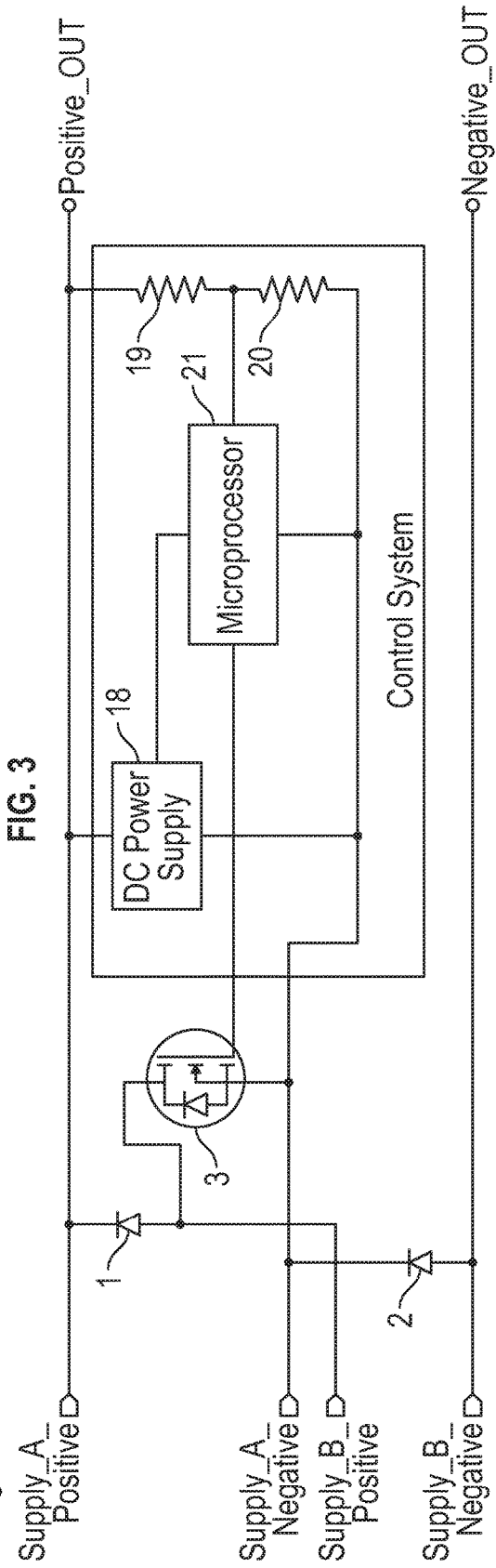
FIG. 3
FIG. 4

SERIAL PARALLEL POWER CONTROLLER

CROSS-REFERENCE TO RELATED APPLICATIONS

Priority is claimed from U.S. Provisional Application No. 61/946,975 filed on Mar. 3, 2014.

STATEMENT REGARDING FEDERALLY SPONSORED RESEARCH OR DEVELOPMENT

Not Applicable

BACKGROUND

This disclosure is related to the field of electrical power supply systems, in particular but not exclusively those used in electrically operated apparatus deployed in wellbores.

In some circumstances, such as in subsurface wellbore drilling using drilling tools having electrically operated devices therein, there is a need to generate electrical power proximate the drilling tools. Electrical power may be generated using a turbine rotated by the flow of drilling fluid through the drilling tools. The turbine may be rotationally coupled to a generator. Because the fluid flow in a drilling operation may vary, depending on, for example, the needs for washing out the drilling debris, as well as other functions provided by the flow of drilling fluid, and because the turbine and consequently the generator rotation speed varies with the change in flow, the generator rotational speed or RPM may vary over a relatively wide range. This variance is a problem because most electronic device power supplies have a limited usable voltage range.

Devices and methods known in the art for taking into account the expected range of fluid flow rates includes limiting the flow rate variance to a predetermined range and selecting a generator based on the RPM range that is expected. Different generators may be designed to operate in different RPM ranges. It known in the art for a drilling tool generator to be changed during a drilling operation because of the need to change the flow rate of the mud as the drilling progresses. Thus, an expected RPM range laterin a drilling operation may be different than the range which is supported by the generator used at the beginning of the drilling operation.

Attempts to address RPM range electrically without the need to change the generator have included switching relays to change generator output connection. Relay switching may cause a momentary interruption of the output power, which is typically undesirable for the circuitry being powered in the drilling tools.

SUMMARY

This disclosure relates to means to enable a generator to work over a much broader RPM range while providing power output in a smaller voltage range. In some embodiments a power controller has a first power supply with a positive and a negative output terminal. A circuit for measuring voltage and for control is coupled to the positive and negative output terminals of the first power supply and a second power supply. A main switching element is coupled between the negative output terminal of the first power supply and the positive output terminal of the second power supply. The positive output terminal of the second power supply is connected to an electrical load and a first pair of diodes is serially connected across the electrical load. The circuit for measuring voltage and for control may close the main switching element when a measured voltage exceeds a selected threshold such that the first power supply and the second power supply are connected to the electrical load in parallel when the first main switching element is closed.

In some embodiments, a method for controlling power includes measuring a first voltage output of a first and/or a second power supply connected in series across an electrical load, which has a pair of diodes connected in series across it. The method also includes closing a main switching element coupled between the series-connected output terminals of the first and/or second power supplies when the measured voltage exceeds a selected threshold. The first and second power supplies are connected in parallel across the electrical load when the main switching element is closed.

In some embodiments, a wellbore tool includes a turbine disposed in a drill string. The tool also includes a pump coupled to the drill string to move fluid through the drill string so as to rotate the turbine. Further, the tool includes at least one of a two-output generator and at least two generators rotationally coupled to the turbine, an electrical output of the at least one of a two-output generator and the at least two generators each having a positive output terminal and a negative output terminal. The tool also includes a first main switching element coupled between (i) the negative output terminal of one of the two-output generator and/or the at least two generators and (ii) the positive output terminal of the other of the two-output generator and/or the two generators. The positive output terminal of the two-output generator and/or the two generators and the negative output terminal of the other of the two-output generator and/or the two generators are connected to an electrical load and a first pair of diodes is serially connected across the electrical load, the first voltage measuring and control circuit closes the main switching element when a measured voltage exceeds a selected threshold such that the two-output generator and/or the two generators are connected to the electrical load in parallel when the first main switching element is closed.

Such example arrangements for connecting the different sources may allow such switching to take place substantially without interrupting the delivered power.

BRIEF DESCRIPTION OF THE DRAWINGS

FIG. 3 is an example of a control system with switching hysteresis and transistor protection added.

FIG. 4 is an example of a control system using a processor.

DETAILED DESCRIPTION

In various example embodiments of a power controller according to the present disclosure, a circuit may be used to dynamically connect multiple stators in a multi-stator generator, multiple generators and/or multiple electrical power sources either in series or in parallel to maintain the delivered output voltage within a defined working range over a wide range of generator rotational speeds. The foregoing function may be obtained using any number, N, of similarly configured electrical power sources, but for purposes of simplicity and clarity of the present description, only two electrical power sources and their interconnection and control circuitry will be described in detail. The same type of circuit configuration may be extended to any selected number of electrical power sources.

In one example embodiment, if the electrical power source comprises an AC generator, wherein electrical power is generated in one or more stator coils, each stator coil (or individual generator or other AC power source) may have its output power rectified through a single phase or multi-phase rectifier such as a bridge rectifier to obtain DC power output from each stator (or other AC power source as set forth above). If DC generator(s) are used, the output current from each generator will not require separate rectification. Each power source will thereby have a respective positive output terminal and negative output terminal. As explained above, a plurality of electrical power sources may be configured as separate generators, or a plurality of field coils (e.g., AC generator stators) disposed in a common housing and using a common rotor.

Figure 1:
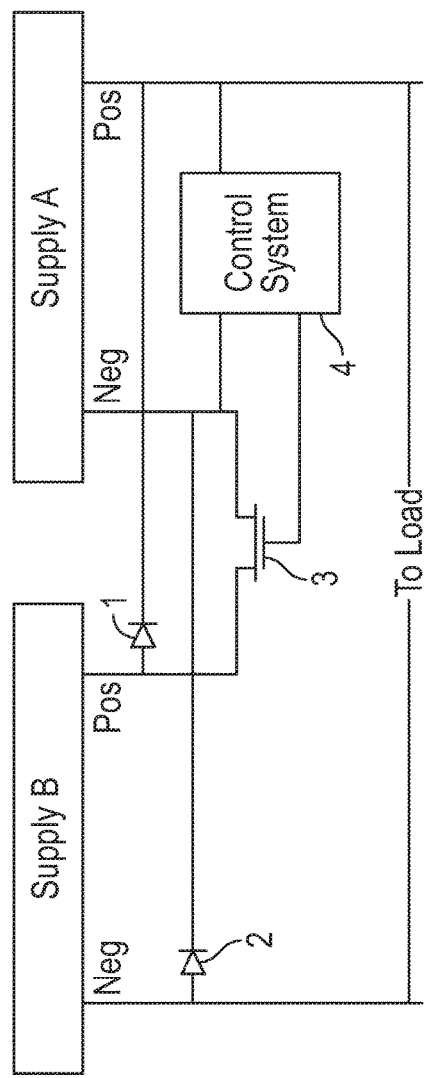
FIG. 1 show elements of an example embodiment of a power system.

Referring to FIG. 1, two power sources configured as explained above may be referred to as Supply A and Supply B. The respective power outputs of Supply A and Supply B may then connected in parallel through a pair of diodes, 1, 2. In the present example embodiment, the Supply B positive output terminal is connected to the anode of a first diode 1 and the Supply A positive output terminal connected to the cathode of the first diode 1. A second diode 2 is connected between the negative terminals of the Supply A and the Supply B, with the anode of the second diode 2 connected to the supply B negative output terminal and the cathode thereof connected to the supply A negative output terminal.

The supply A positive terminal and the supply B negative output terminal form power source output terminals that connect to an electrical load. A control system 4 may be connected between the positive and negative terminals of the Supply A. The control system 4 measures the voltage output of the Supply A and is configured to operate a main switching element 3, explained below, to effect switching of the Supply A and the Supply B output terminals from series connection to parallel connection across the electrical load. The main switching element 3 may be connected between the Supply A negative output terminal, and the Supply B positive output terminal. When the main switching element 3 is switched off (open circuit), the Supply A and the Supply B output terminals are connected in parallel through the first 1 and second 2 diodes. The main switching element may be, for example, a power transistor such as a power field effect transistor, a silicon controlled rectifier or a relay. When the main switching element 3 is switched on (closed circuit), the Supply A and the Supply B output terminals are connected in series across the electrical load through the main switching element 3 and the first and second diodes 1, 2 are electrically connected so as to be in a non-conducting state.

Switching may be performed substantially without interrupting output power during the switchover, i.e., when the main switching element 3 is switched on or off. Control of the main switching element 3, i.e., the configuration of the control system 4, may be implemented in a number of different ways, for example using a processor (explained with reference to FIG. 4), to simple circuitry such as four discrete components including two resistors, a diode, and a transistor (see FIG. 2). The function of the control system 4 is to measure the voltage output of the power supply (consisting of the combined output of the Supply A and the Supply B and based on the measured voltage output switching on or off the main switching element 3. Other circuitry may be added to the control system 4 depending on other desired features such as, but not limited to, switching hysteresis control, extended voltage range, over voltage protections, and over current protection.

Figure 2:
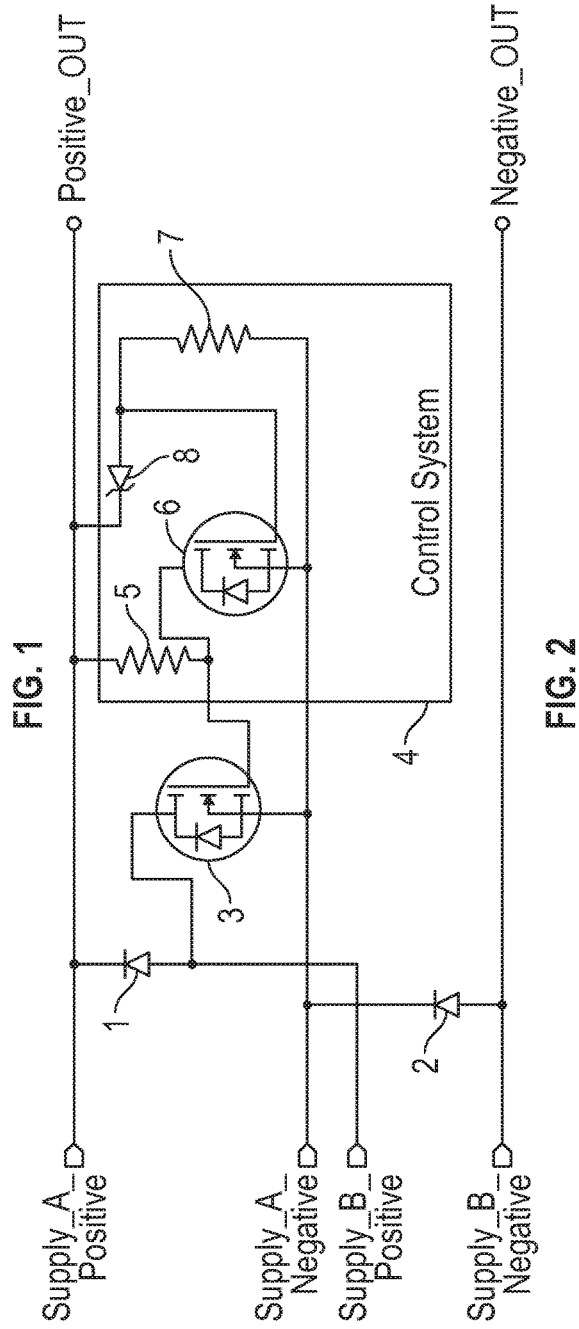
FIG. 2 is an example of a minimal control system.

To better understand how the above described system works, and referring to FIG. 2 which shows the above described four discrete component control system 4, consider voltage output at the Supply A and the Supply B starting at zero volts through their respective highest voltages. 50 volts may be used in this example for illustrative purposes only, it being clearly understood that any other highest voltage may be used in other embodiments.

The Supply A and the Supply B output terminals will be connected in parallel across the electrical load until the output voltage reaches a predetermined voltage detected by the control system 4. At this point the voltage on a gate resistor (5) will cause the main switching element (3) to switch on and connect the output of the power supplies (i.e., supply A and supply B in series).

The supply A and supply B will remain connected in series through the main switching element 3 and thus to the electrical load until the voltage of supply A is greater than the voltage drop across a zener diode 8 by an amount equal to the switch on voltage of a transistor 6. When this voltage is reached and transistor 6 is switched on, the main switching element 3 is switched off and the Supply A and Supply B are put into parallel connection across the electrical load through the first 1 and second 2 diodes. A first resistor 7 loads the gate of the transistor 6 to reverse the process when the supply voltage drops. The transistor 6 loads a second resistor 5 when the transistor 6 is switched on.

Because of fluctuations in the output voltage of Supply A and Supply B, it may be desirable to have hysteresis in the predetermined switching voltage used to operate the main switching element 3. Referring to FIG. 3 hysteresis in the predetermined switching voltage may be obtained using a third resistor 9, second transistor 10, fourth resistor 11, second zener diode 12 and fifth resistor 13 in gate control circuitry for the transistor 6. A third 14, fourth 15 and fifth 16 zener diode and a sixth resistor 17 may be added to the control system connected as shown in FIG. 3 to protect their respective transistors 6, 10 from over voltage noise that may occur.

In FIG. 4, the main switching element 3 may be operated by a processor 21. Because the voltage from the supplies varies, the processor 21 may include its own regulated-voltage power supply 18. The processor 21 may measure the output voltage of either Supply A or Supply B through a resistor divider shown at 19 and 20 and controls the switching accordingly. Control characteristics, for example and without limitation, switching hysteresis, voltage thresholds and switching rate may each be determined by suitable programming instructions implemented in the processor 21. The processor 21 may be, without limitation, a programmable microprocessor, field programmable gate array, an application specific integrated circuit or a programmable logic controller.

Figure 5:
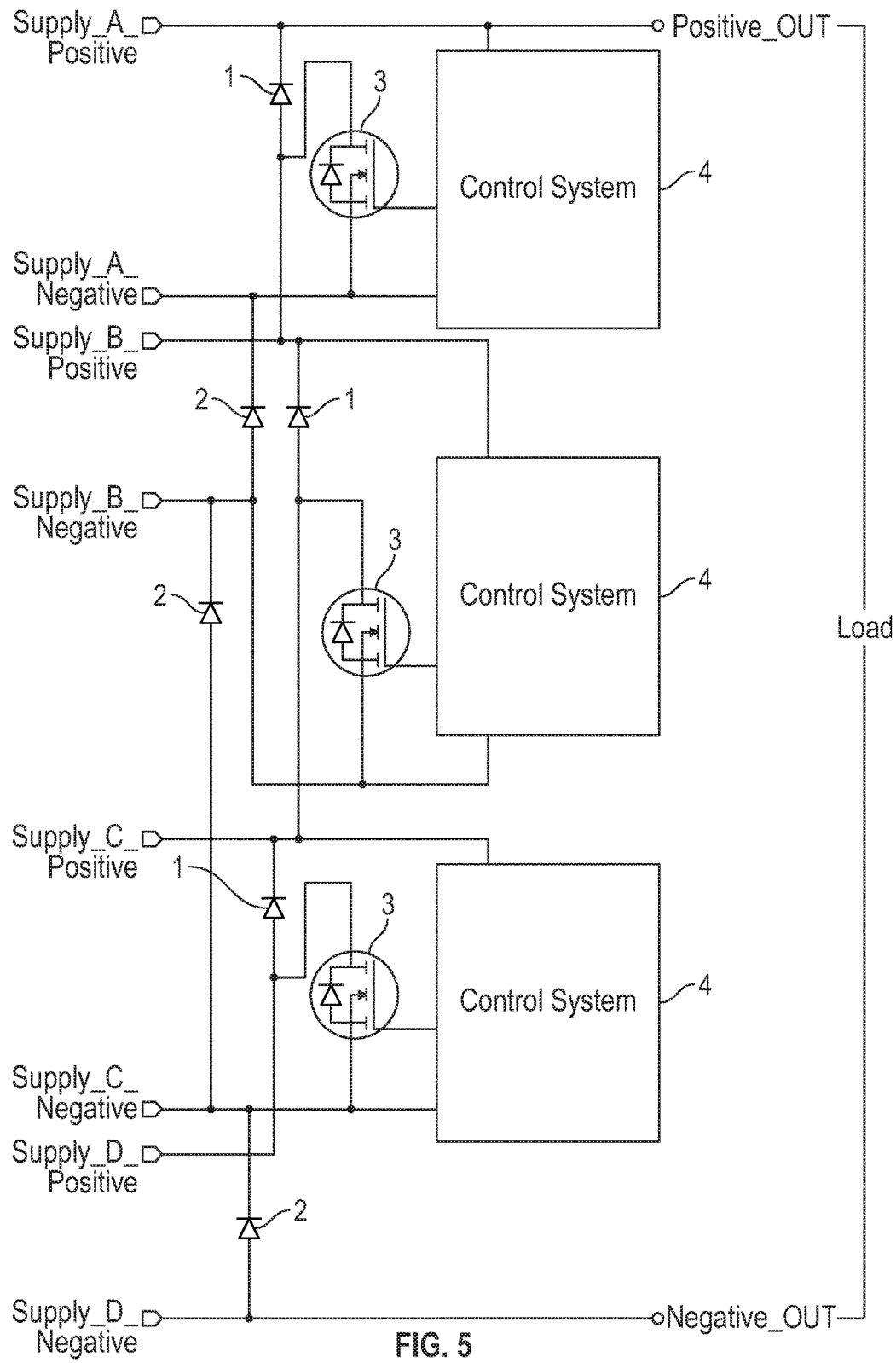
FIG. 5 schematically shows how embodiments as set forth herein may be used for more than two power supplies.

FIG. 5 shows an example embodiment having a number, N, in the present example three, of individual power supplies. In the example shown in FIG. 5, the switching voltage for each of a plurality or main switching elements 3 can each be set differently by suitable configuration of each respective control system 4, or the switching voltage may be set, for example, in progressing pairs. Any chosen manner of switching voltage selection may increase the usable input voltage range of the power controller.

Figure 6:
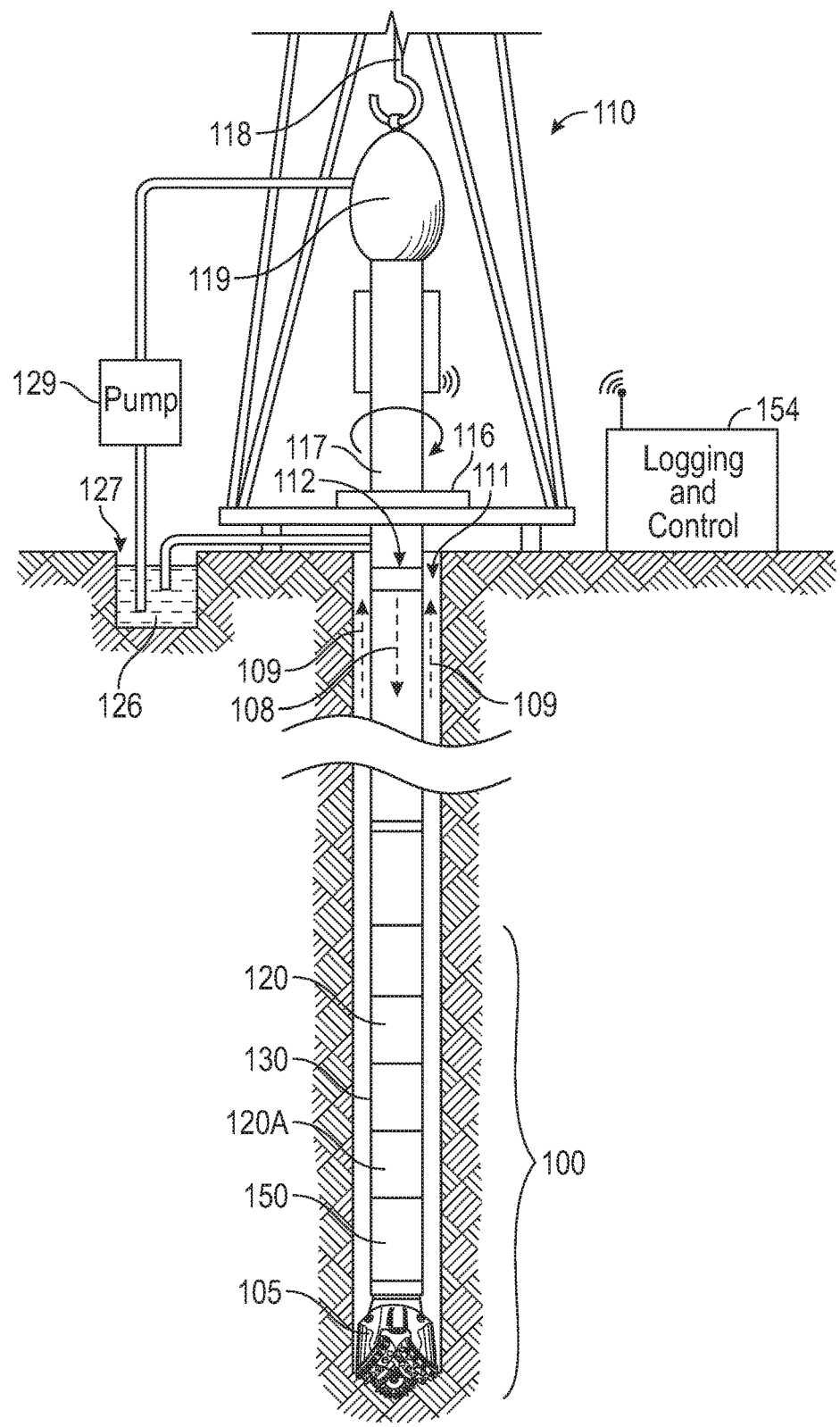
FIG. 6 shows an example drilling system having electrically operated drilling tools.

FIG. 6 shows a simplified schematic view of a wellbore drilling system in which various embodiments of a power controller according to the present disclosure may be used. The wellbore drilling system shown in FIG. 6 may be deployed either on land or offshore. In the described drilling system, a wellbore 111 may be formed in subsurface formations by rotary drilling in a manner that is well known to those skilled in the art. Some embodiments may also use directional drilling.

A drill string 112 is suspended within the borehole 111 and has a bottom hole assembly (BHA) 100 which includes a drill bit 105 at its lower end. A surface system includes a platform and derrick assembly 110 positioned over the wellbore 111, with the platform and derrick assembly 110 including a rotary table 116, kelly 117, hook 118 and rotary swivel 119. In a drilling operation, a drill string 112 is rotated by the rotary table 116 (energized by means not shown), which engages the kelly 117 at the upper end of the drill string 112. The drill string 112 is suspended from a hook 18, attached to a traveling block (also not shown), through the kelly 117 and a rotary swivel 19 which permits rotation of the drill string 112 relative to the hook 118. As is well known, a top drive system could be used in other embodiments of a drilling system instead of the kelly, rotary swivel and rotary table.

Drilling fluid ("mud") 126 may be stored in a pit 127 formed at the well site or a tank. A pump 129 moves the drilling fluid 126 to the interior of the drill string 112 via a port in the swivel 119, which causes the drilling fluid 126 to flow downwardly through the drill string 112, as indicated by the directional arrow 108 in FIG. 6. The drilling fluid 126 exits the drill string 112 via ports (not shown separately) in the drill bit 105, and then circulates upwardly through the annulus region between the outside of the drill string 112 and the wall of the wellbore 111, as indicated by the directional arrows 109. In this known manner, the drilling fluid lubricates the drill bit 105 and carries formation cuttings up to the surface as it is returned to the pit 127 for recirculation.

The drill string 112 includes a bottom hole assembly (BHA) 100 which in an example embodiment may comprise one MWD module 130 and multiple LWD modules 120 (with reference number 120A depicting a second LWD module). As used herein, the term "module" as applied to MWD and LWD devices may be understood to mean either a single instrument or a suite of multiple instruments contained in a single modular device. Additionally, the BHA 100 may includes a rotary steerable system (RSS) and motor 150 and the drill bit 105.

The LWD modules 120 may be disposed in a drill collar or in respective drill collars and may include one or more types of well logging instruments. The LWD modules 120 may include devices for measuring, processing, and storing information, as well as for communicating with surface equipment. By way of example, the LWD module 120 may include, without limitation, a nuclear magnetic resonance (NMR) logging tool, an electromagnetic induction and/or electromagnetic propagation resistivity tool, a nuclear tool (e.g., gamma-ray), a laterolog resistivity tool, a photoelectric factor tool, a neutron hydrogen index tool, a neutron capture cross-section tool and/or a formation density tool. The LWD module 120, in general, may include any type of logging tool suitable for acquiring measurements that may be processed to generate wellbore images.

The MWD module 130 may also be housed in a drill collar, and can contain one or more devices for measuring characteristics of the drill string and drill bit. In the present embodiment, the MWD module 130 may include one or more of the following types of measuring devices: a weight-on-bit measuring device, a torque measuring device, a vibration measuring device, a shock measuring device, a stick/slip measuring device, a direction measuring device, and an inclination measuring device (the latter two sometimes being referred to collectively as a direction and inclination package). The MWD tool 130 may also include an apparatus (see FIG. 7) for generating electrical power for the MWD tool and the LWD tool(s). In some embodiments, such apparatus may include a turbine generator powered by the flow of the drilling fluid 126.

The operation of the platform and derrick assembly 10 of FIG. 6 as well as the LWD modules 120, 120A and MWD module 130 may be controlled using a control system 154 located at the surface. The control system 154 may include one or more processor-based computing systems. In the present context, a processor may include a microprocessor, programmable logic devices (PLDs), field-gate programmable arrays (FPGAs), application-specific integrated circuits (ASICs), system-on-a-chip processors (SoCs), or any other suitable integrated circuit capable of executing encoded instructions stored, for example, on tangible computer-readable media (e.g., read-only memory, random access memory, a hard drive, optical disk, flash memory, etc.). Such instructions may correspond to, for example, processes for carrying out a drilling operation, algorithms and routines for processing data received at the surface from the BHA 100 (e.g., as part of an inversion to obtain one or more desired formation parameters), and the like.

One embodiment of an MWD and LWD module such as shown generally at 120 and 130 in FIG. 6, is shown in more detail in FIG. 7 and for clarity of the explanation will be described as simply an MWD system 130. The MWD system 130 may be disposed inside a non-magnetic housing 47 made from monel or the like and adapted to be coupled within the drill string (see FIG. 6) at its axial ends. The housing 47 may be configured to behave mechanically in a manner similar to other drill collars (in drill string 112 in FIG. 6). The housing 47 includes disposed therein a turbine 43 which converts some of the flow of drilling fluid (126 in FIG. 6) into rotational energy to drive an alternator or generator 45 to power various electrical circuits and sensors in the MWD system 130.

Control over the various functions of the MWD system 130 may be performed by a central processor 46. The processor 46 may also include circuits for recording signals generated by the various sensors in the MWD system 130. In the example embodiment, the MWD system 130 may include a directional sensor 50, having therein tri-axial magnetometers and accelerometers such that the orientation of the MWD system 130 with respect to magnetic north and with respect to earth's gravity can be determined. The MWD system 130 may also include a gamma-ray detector 48 and separate rotational (angular)/axial accelerometers, magnetometers or strain gauges, shown generally at 58. The MWD system 130 may also include a resistivity sensor system, including an induction signal generator/receiver 52, and transmitter antenna 54 and receiver 56A, 56B antennas. The resistivity sensor can be of any type well known in the art for measuring electrical conductivity or resistivity of the formations (13 in FIG. 1) surrounding the wellbore (111 in FIG. 6). The types of sensors in the MWD system 130 shown in FIG. 7 are not meant to be an exhaustive representation of the types of sensors used in MWD systems according to various aspects of this disclosure. Accordingly, the particular sensors shown in FIG. 7 are not meant to limit the scope of the present disclosure.

The central processor 46 periodically interrogates each of the sensors in the MWD system 130 and may store the interrogated signals from each sensor in a memory or other storage device associated with the processor 46. Some of the sensor signals may be formatted for transmission to the earth's surface in a mud pressure modulation telemetry scheme. In the embodiment of FIG. 6 the mud pressure is modulated by operating an hydraulic cylinder 60 to extend a pulser valve 62 to create a restriction to the flow of mud through the housing 47. The restriction in mud flow increases the mud pressure, which is detected by a transducer (associated with the surface control system 154 in FIG. 6)). Operation of the cylinder 60 may be controlled by the processor 46 such that the selected data to be communicated to the earth's surface are encoded in a series of pressure pulses detected by the transducer (not shown) at the surface. Many different data encoding schemes using a mud pressure modulator are well known in the art. Accordingly, the type of telemetry encoding is not intended to limit the scope of the present disclosure. Other mud pressure modulation techniques which may also be used with the disclosed systems and methods include so-called "negative pulse" telemetry, wherein a valve is operated to momentarily vent some of the mud from within the MWD system 130 to the annular space between the housing and the wellbore. Such venting momentarily decreases pressure in the drill string (112 in FIG. 6). Other mud pressure telemetry includes a so-called "mud siren", in which a rotary valve disposed in the MWD housing 47 creates standing pressure waves in the mud, which may be modulated using such techniques as phase shift keying for detection at the earth's surface. Other electromagnetic, hard wired (electrical conductor), or optical fiber or hybrid telemetry systems may be used as alternatives to mud pulse telemetry, as will be further explained below.

Figure 7:
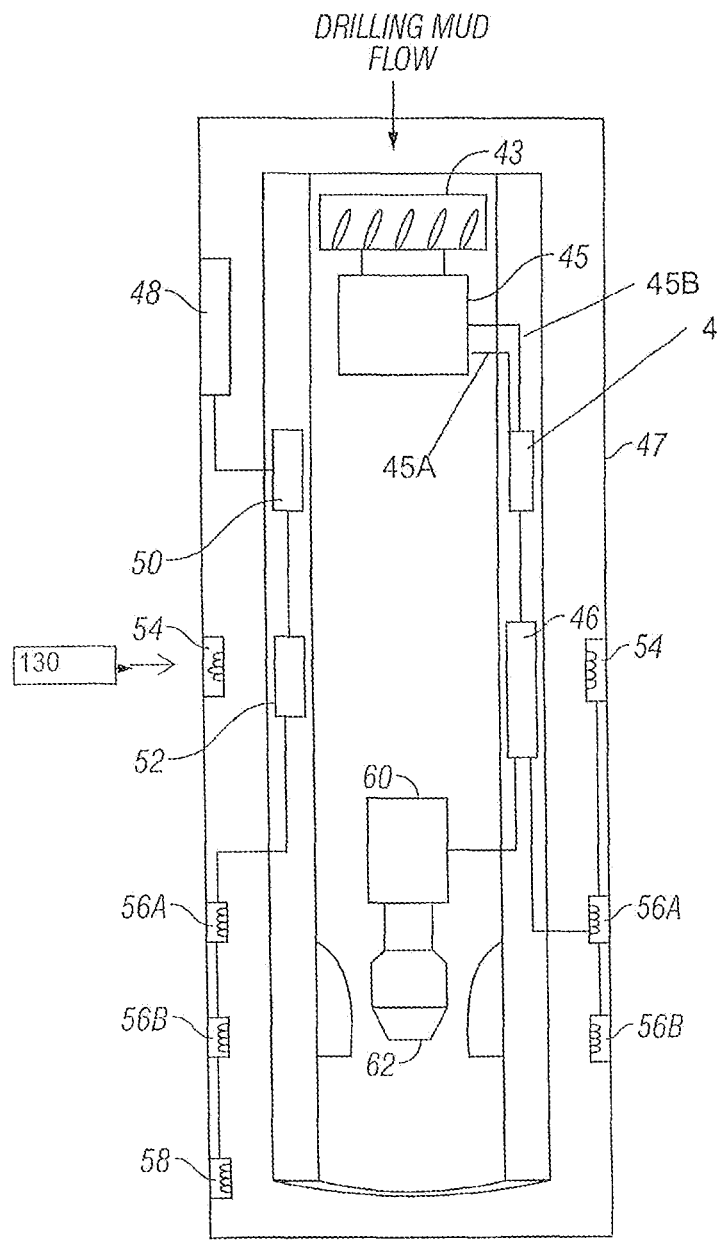
FIG. 7 shows an example electrically operated drilling tool in more detail.

In the example embodiment shown in FIG. 7, the alternator or generator 45 may include, but is not limited to, two power outputs 45A, 45B. The two power outputs 45A, 45B may be rectified if an alternator is used, or may be directly connected to a control system 4 if a DC generator is used. As explained with reference to FIG. 1, either multiple field coils in a single housing may be used, or multiple generators all rotationally coupled to the turbine 43 may be used in various embodiments. The control system 4 may switch connection of the outputs 45A, 45B between series and parallel across the above described components depending on the voltage measured by the control system 4. Operation of the control system 4 may be substantially as explained with reference to FIGS. 2, 3 and 4.

Another application for a system according to the present disclosure is in a wind-power turbine electrical generator system. Because there is such a variance in the wind force, wind-powered turbine generators are known either to waste extra power when the wind velocity is excessive, or in the case of very large wind turbines, there is a complicated transmission between the wind turbine rotary output and the rotary input of the generator. A control system according to the present disclosure may help eliminate the need for a mechanical transmission.

In the case of solar powered electric generators, because of ambient light change caused variance in the voltage output from such generators, a control system according to the present disclosure may also be useful in optimizing output from such generators.

Although the preceding description has been described herein with reference to particular means, materials and embodiments, it is not intended to be limited to the particulars disclosed herein; rather, it extends to all functionally equivalent structures, methods and uses, such as are within the scope of the appended claims.

What is claimed is:
1. A power controller, comprising
   at least a first power supply having a positive and a negative output terminal;
   at least a second power supply having a positive and a negative output terminal;
   at least a first voltage measuring and control circuit coupled to the positive and negative output terminals of at least one of the at least a first or the at least a second power supply;
   at least a first main switching element coupled between the negative output terminal of the at least a first power supply and the positive output terminal of the at least a second power supply; and
   wherein the positive output terminal of the at least a first power supply and the negative output terminal of the at least a second power supply are connected to an electrical load, and wherein at least a first pair of diodes is serially connected across the electrical load, the first voltage measuring and control circuit configured to close the first main switching element when a measured voltage exceeds a selected threshold such that the at least a first power supply and the at least a second power supply are connected to the electrical load in parallel when the at least a first main switching element is closed.

2. The power controller of claim 1 wherein the at least a first power supply and the at least a second power supply comprise a generator having at least two field coils.

3. The power controller of claim 2 wherein the field coils each comprises a stator of an alternator.

4. The power controller of claim 1 wherein the at least a first power supply and the at least a second power supply comprise separate generators.

5. The power controller of claim 1 further comprising at least a third power supply having a positive output terminal and a negative output terminal, the at least a third power supply connected in series with the at least a first power supply and the at least a second power supply to the electrical load, the at least a third power supply having at least a second pair of diodes connected in series with the at least a first pair of diodes, the power controller comprising at least a second voltage measuring and control circuit connected between the positive and negative output terminals of at least one of the second and third power supplies, the at least a second voltage measuring and control circuit configured to operate at least a second main switching element such that the at least a second power supply and the at least a third power supply are connected to the electrical load in parallel when the at least a second main switching element is closed, the at least a second voltage measuring and control circuit configured to operate the at least a second main switching element when a measured voltage exceeds a selected threshold.

6. The power controller of claim 5 wherein the selected threshold of the first voltage measuring and control circuit is a same voltage as the selected threshold of the second voltage measuring and control circuit.

7. The power controller of claim 5 wherein the selected threshold of the first voltage measuring and control circuit is a different voltage than the selected threshold of the second voltage measuring and control circuit.

8. The power controller of claim 5 further comprising a hysteresis circuit functionally coupled to each of the first and the second voltage measuring and control circuits.

9. The power controller of claim 8 wherein the first and second voltage measuring control circuits comprise discrete electronic components.

10. The power controller of claim 5 wherein the at least a first and the at least a second voltage measuring and control circuits comprise a processor.

11. The power controller of claim 1 further comprising a hysteresis circuit functionally coupled to the at least a first voltage measuring and control circuit.

12. The power controller of claim 1 wherein the at least a first voltage measuring and control circuit comprises discrete electronic components.

13. The power controller of claim 1 wherein the at least a first voltage measuring and control circuit comprises a processor.

14. The power controller of claim 1 wherein the at least a first voltage measuring and control circuit comprises an overvoltage protection circuit.

15. A method for controlling power, comprising:
measuring a first voltage output of at least one of a first or a second power supply connected in series across an electrical load, the electrical load having a pair of diodes connected in series thereacross; and
closing a first main switching element coupled between series connected output terminals of the at least a first and second power supplies when the measured voltage exceeds a selected threshold, whereby the first and second power supplies are connected in parallel across the electrical load when the first main switching element is closed.

16. The method of claim 15 further comprising applying hysteresis to the selected threshold.

17. The method of claim 15 further comprising:
measuring a second voltage output of at least one of the second and a third power supply connected in series across an electrical load with the first power supply, the electrical load having a second pair of diodes connected in series across output terminals of the third power supply'
closing a second main switching element coupled between series connected output terminals of the at least the second and the third power supplies when the measured voltage exceeds a selected threshold, whereby the at least a second and the third power supplies are connected in parallel across the electrical load when the second main switching element is closed.

18. The method of claim 17 wherein the selected threshold for the first measured voltage output is a same voltage as the selected threshold for the second measured voltage output.

19. The method of claim 17 wherein the selected threshold for the first measured voltage output is a different voltage than the selected threshold for the second measured voltage output.

20. The method of claim 15 wherein the first and second power supplies comprise at least one electric generator rotated by pumping fluid through a drilling tool disposed in a wellbore.

21. A wellbore tool, comprising:
a turbine disposed in a drill string;
a pump coupled to the drill string to move fluid therethrough so as to rotate the turbine;
at least one of a two-output generator or at least two generators rotationally coupled to the turbine, an electrical output of the at least one of a two-output generator or the at least two generators each having a positive output terminal and a negative output terminal;
a first voltage measuring and control circuit coupled to the positive and negative output terminals of the at least one of the at least one of a two-output generator or the at least two generators;
at least a first main switching element coupled between (i) the negative output terminal of one of the least one of a two-output generator or the at least two generators and (ii) the positive output terminal of the other of the at least one of a two-output generator or the at least two generators; and
wherein the positive output terminal of the one of the at least one of a two-output generator or the at least two generators and the negative output terminal of the other of the at least one of a two-output generator or the at least two generators are connected to an electrical load, and wherein at least a first pair of diodes is serially connected across the electrical load, the first voltage measuring and control circuit configured to close the first main switching element when a measured voltage exceeds a selected threshold such that the at least one of a two-output generator or the at least two generators are connected to the electrical load in parallel when the at least a first main switching element is closed.

22. The wellbore tool of claim 21 wherein the selected threshold of the first voltage measuring and control circuit is a same voltage as the selected threshold of a second voltage measuring and control circuit, the second voltage measuring and control circuit coupled to the positive and negative output terminals of the other output of the at least one of a two-output generator or the at least two generators.

23. The wellbore tool of claim 21 wherein the selected threshold of the first voltage measuring and control circuit is a different voltage than the selected threshold of a second voltage measuring and control circuit, the second voltage measuring and control circuit coupled to the positive and negative output terminals of the other output of the at least one of a two-output generator or the at least two generators.

24. The wellbore tool of claim 21 further comprising a hysteresis circuit functionally coupled to each of the first voltage measuring and control circuit and a second voltage measuring and control circuit, the second voltage measuring and control circuit coupled to the positive and negative output terminals of the other output of the at least one of a two-output generator or the at least two generators.

25. The wellbore tool of claim 24 wherein the first and second voltage measuring control circuits comprise discrete electronic components.

26. The wellbore tool of claim 21 wherein the first voltage measuring and control circuit and a second voltage measuring and control circuit comprise a processor, the second voltage measuring and control circuit coupled to the positive and negative output terminals of the other output of the at least one of a two-output generator or the at least two generators.

* * * * *